May 12, 1959 V. J. O'MALLEY ET AL 2,886,002
LIVESTOCK FEEDER
Filed Dec. 3, 1956 2 Sheets-Sheet 1
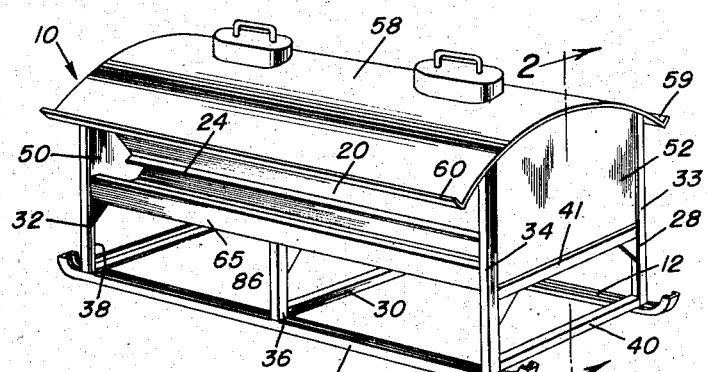
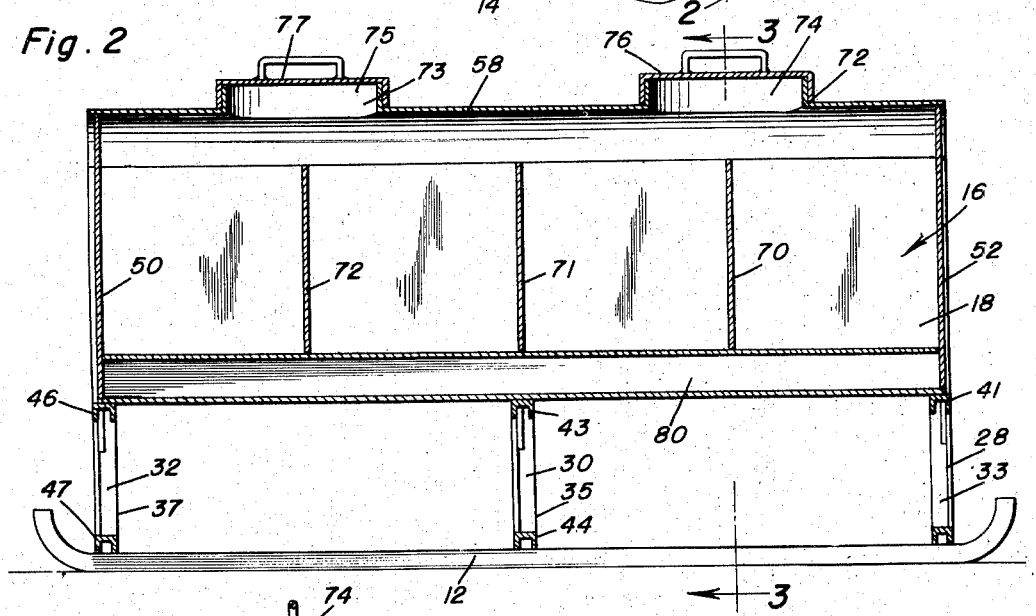
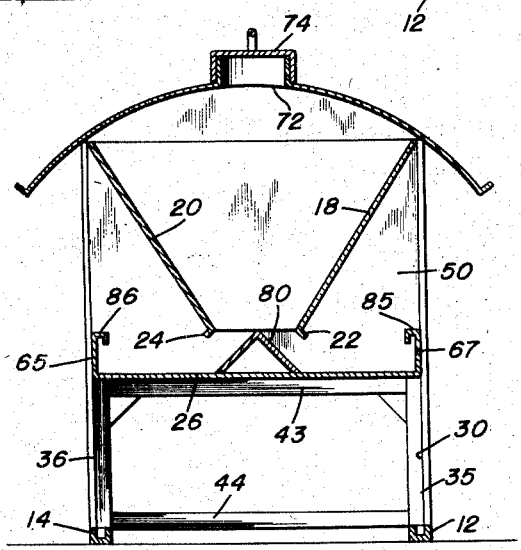
Vincent J. O'Malley
John R. Murphy
INVENTORS May 12, 1959 V. J. O'MALLEY ET AL 2,886,002
LIVESTOCK FEEDER
Filed Dec. 3, 1956 2 Sheets-Sheet 2

Vincent J. O'Malley
John R. Murphy
INVENTORS

United States Patent Office 2,886,002
Patented May 12, 1959

2,886,002

LIVESTOCK FEEDER

Vincent J. O'Malley, Lakeview, and John R. Murphy, Adel, Oreg.

Application December 3, 1956, Serial No. 625,657

1 Claim. (Cl. 119—77)

This invention relates to livestock feeders and more particularly to a livestock feeder which has high capacity so as to function as a storage bin for the feed and which is capable of handling liquid and non-liquid feed.

An object of the invention is to provide a livestock feeder which is specially intended for cattle and sheep and which is arranged for a very high capacity of feed whereby to enable suppliers to deliver with tank cars, tank trucks and the like, dispensing with barrels and containers of that type in order to afford a saving of labor and expense involved in handling the same.

In recent years the practice of putting out a large quantity of feed for livestock has been made possible by the mixing of approximately one-third granulated salts with grain and/or cotton seed feed supplements. The salt limits the amount of feed consumed by each animal, thereby making it practical to put a large quantity of feed in their midst. However, even with this practice, to our knowledge there has not been an advance corresponding to this in the feeders for livestock. Accordingly, a further object of the invention is to take advantage of a feature of this new practice by having a very high capacity feeder that functions as a storage tank, the feeder being capable of being moved from one position to another in order to keep it in a clean place in the feed lot. The saving is appreciated in three ways, namely: labor, feed and maintenance.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a perspective view of one form of the invention;

Figure 2 is a longitudinal sectional view of a feeder that is constructed in accordance with the invention and taken on the line 2—2 of Figure 1;

Figure 3 is a transverse sectional view taken on the line 3—3 of Figure 2;

Figure 4:
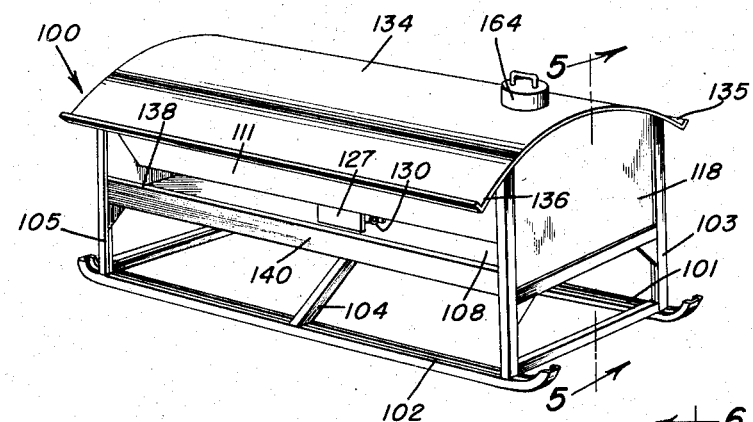
Figure 4 is a perspective view of a modified form of the invention, the illustrated feeder being especially useful in connection with liquid feed.

In the accompanying drawings there is a feeder 10 which is constructed in accordance with the invention. This feeder is preferably of all metal construction and includes a pair of skids 12 and 14, each skid having an upturned end to facilitate the movement of the feeder from one location to another. Although other sections of skids may be adopted, it is preferred that the skids be channels, for both strength and rigidity of construction.

There is a bin 16 carried by the skids and in which livestock feed is adapted to be supported. The bin is constructed of two downwardly and inwardly tapering sides 18 and 20 which have outwardly extending stiffening lips 22 and 24 at the lower edges thereof. These lips are vertically spaced from panel 26, the latter being secured above skids 12 and 14 by means of a plurality of legs. There are three leg frames 28, 30 and 32 respectively, the three leg frames being ample to support the rather heavy load involved in the feeder 10. Each leg frame consists of a vertical leg, there being vertical legs 33 and 34 in frame 28, legs 35 and 36 in leg frame 30 and legs 37 and 38 in leg frame 32. Upper and lower transverse braces 40 and 41 are fixed to the legs 33 and 34; upper and lower transverse braces 43 and 44 are fixed to the legs 35 and 36; and upper and lower transverse braces 46 and 47 are secured to the legs 37 and 38. Sides for side walls 18 and 20 of bin 16 have end walls 50 and 52 secured thereto, these end walls being connected to the transverse braces 41 and 46 and having smoothly curved upper edges. These upper edges accommodate a convex cover 58 having flanges 59 and 60 that overhang the sides of the feeder and that form eave troughs to prevent water from dripping and blowing into the feeder trough. The space between the upper edges of sides 18 and 20 and the upper edges of longitudinally extending, vertical walls 65 and 67 on the edges of panel 26 provide entrances for the livestock in order to have access to the interior of the feeder.

A plurality of baffles 70, 71 and 72 are secured at their opposite edges to the sides 18 and 20 and are spaced from each other. They are welded at the sides to strengthen the body of the feeder and form dividers that separate the bin into compartments. Cover 58 has two openings 72' and 73 in the top thereof from which necks 74 and 75 extend. Closure caps 76 and 77 are fitted on the necks 74 and 75 and have handles to facilitate the removal and replacement thereof. The lower end of the bin 16 is open, but there is an angular baffle 80 whose apex faces the discharge end of the bin and which is carried by panel 26. This directs the feed to opposite sides of the feeder so that the livestock may feed simultaneously from both sides of the feeder.

In use of the feeder as disclosed in Figures 1–3, the closure caps are removed and feed applied into the bin 16. It flows by gravity onto the panel 26 and up to the vertical walls 65 and 67, each having a down turned safety lip 85 and 86 respectively on the upper edge thereof.

The cattle feed through the previously described entrances, obtaining feed from the panel 26. The overhanging parts 59 and 60 of cover 58 provide ample protection during the feeding operations and between feeding operations inasmuch as the rain, snow, etc. does not easily enter the feeder.

Figure 5:
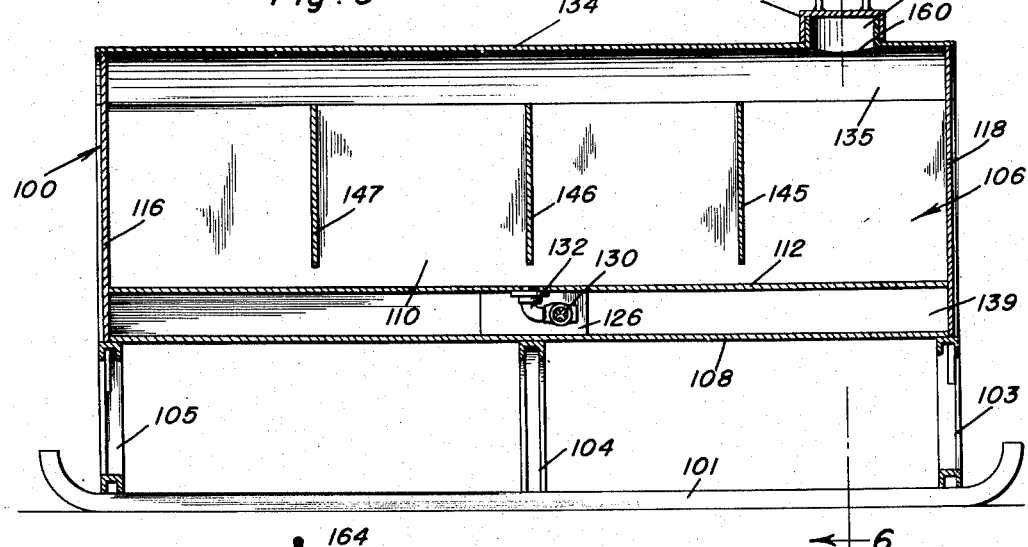
Figure 5 is a longitudinal sectional view taken on the line 5—5 of Figure 4.
Figure 6:
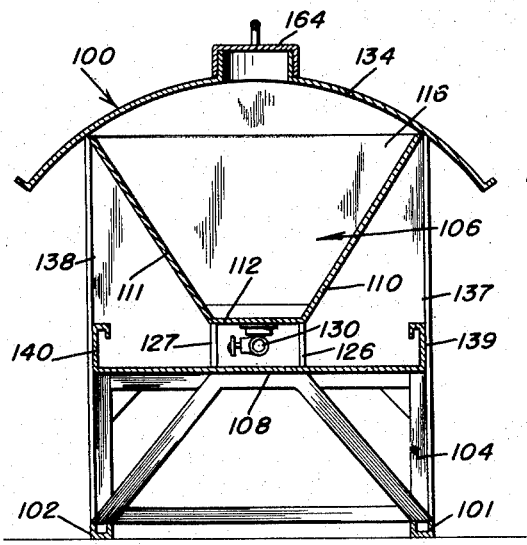
Figure 6 is a transverse sectional view taken on the line 6—6 of Figure 5.

Attention is now invited to Figures 4–6 where the principles of the invention are demonstrated in a slightly different way. Here, the feeder 100 is illustrated as being capable of handling liquid feed for livestock. The general organization and construction is approximately the same as that of Figure 1–3. Feeder 100 includes skids 101 and 102, three leg frames 103, 104 and 105, together with a bin 106 which is capable of supporting liquid and dispensing it onto panel 108 which corresponds in both function and construction to panel 26. As seen in Figure 6, bin 106 is made of two sides 110 and 111 which taper downwardly and inwardly toward each other. They terminate at bottom wall 112 which is fixed to the lower edges of sides 110 and 111 and also fixed to the end walls 116 and 118 of the feeder. Vertical supports 126 and 127 are secured beneath bottom 112 and to the upper surface of panel 108 in order to help support the bin 106 and also to protect the valve 130 and liquid outlet 132 that is controlled by the valve 130, or protect the float of a float valve.

As in the previously described embodiment of the invention, there is a cover 134 having parts 135 and 136 which overhang the entrances 137 and 138 through which the livestock has access to the interior of the feeder and more particularly to the feed which is on panel 106 and within the confines of upstanding walls 139 and 140 along the longitudinal edges of panel 108.

A plurality of dividers 145, 146 and 147 are secured to the sides 110 and 111, but spaced vertically from the bottom wall 112 of the bin 106 in order to permit the liquid feed to be co-mingled. Cover 134 has an inlet opening 160 with which neck 162 is connected. This neck supports a closure cap 164, which, like the previously described closure caps 76 and 77, has a depending skirt, an upper panel and a handle secured to the upper panel so as to have a neat, tightly fitting closure for the feeder.

The use of this embodiment of the invention is the same as the use of the previously described embodiment. However, in order to have proper control of the quantity of liquid feed in the feeder and accessible to the animals, the hand operated valve 130 is manually controlled by the farmer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A livestock feeder comprising a bin having a pair of downwardly converging sides that are spaced apart at their lower edges, a horizontal bottom wall secured to the lower edges of said sides, a plurality of horizontally spaced vertical dividers secured to said converging sides to thereby brace said converging sides, said dividers vertivally spaced from said bottom to provide a passage through which liquid may flow, end walls secured to the ends of said sides and said bottom wall to form a liquid-tight bin, said bottom having a discharge opening, means including a valve mounted therein for controlling flow through said discharge opening, a panel located below said bottom of said bin and having upstanding sides, said end walls constituting end walls and attached to said panel to form a liquid-tight tray in which liquid from the bin is adapted to pass, legs having connecting horizontal transverse braces and longitudinal skids which support said panel and said bin, said panel sides spaced vertically from said bin sides to provide entrances for the livestock, a cover having extending edges over said bin and having a filler opening therein, edge portions of said cover overlying said livestock entrances.

References Cited in the file of this patent

UNITED STATES PATENTS

| | | |
|---|---|---|
| 1,049,111 | Logsdon et al. | Dec. 31, 1912 |
| 1,125,044 | Beane | Jan. 19, 1915 |
| 1,347,070 | York | July 20, 1920 |
| 1,468,668 | Mitchell | Sept. 25, 1923 |
| 2,166,982 | Wilson | July 25, 1939 |
| 2,345,400 | Laughhead et al. | Mar. 28, 1944 |
| 2,454,721 | Severance et al. | Nov. 23, 1948 |
| 2,650,566 | Rook | Sept. 1, 1953 |

FOREIGN PATENTS

| | | |
|---|---|---|
| 18,311/34 | Australia | Feb. 25, 1935 |